(12) United States Patent
Stojanovski et al.

(10) Patent No.: US 10,499,236 B2
(45) Date of Patent: Dec. 3, 2019

(54) SECURE DIRECT DISCOVERY AMONG USER EQUIPMENT

(71) Applicant: INTEL IP CORPORATION, Santa Clara, CA (US)

(72) Inventors: Alexandre Saso Stojanovski, Paris (FR); Farid Adrangi, Lake Oswego, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/749,704

(22) PCT Filed: Dec. 21, 2015

(86) PCT No.: PCT/US2015/067088
§ 371 (c)(1),
(2) Date: Feb. 1, 2018

(87) PCT Pub. No.: WO2017/027056
PCT Pub. Date: Feb. 16, 2017

(65) Prior Publication Data
US 2018/0234827 A1  Aug. 16, 2018

Related U.S. Application Data

(60) Provisional application No. 62/203,598, filed on Aug. 11, 2015, provisional application No. 62/204,803, (Continued)

(51) Int. Cl.
*H04W 8/00* (2009.01)
*H04L 29/06* (2006.01)
(Continued)

(52) U.S. Cl.
CPC ........... *H04W 8/005* (2013.01); *H04L 63/061* (2013.01); *H04L 63/0869* (2013.01); *H04W 4/70* (2018.02);
(Continued)

(58) Field of Classification Search
CPC ..... H04W 12/06; H04W 76/14; H04W 8/005; H04W 12/04; H04W 4/70; H04L 63/061; H04L 63/0869
(Continued)

(56) References Cited

U.S. PATENT DOCUMENTS

| 2005/0132232 | A1* | 6/2005 | Sima | G06F 21/577 |
| | | | | 726/4 |
| 2013/0173905 | A1* | 7/2013 | Inatomi | H04L 9/0662 |
| | | | | 713/150 |
| 2014/0119544 | A1* | 5/2014 | Lee | H04W 12/10 |
| | | | | 380/270 |

FOREIGN PATENT DOCUMENTS

| CN | 107852418 | 3/2018 |
| WO | WO-2014208032 A1 | 12/2014 |

(Continued)

OTHER PUBLICATIONS

ETSI TS 133 303 V12.4.0 (Jul. 2015); Universal Mobile Telecommunications System (UMTS); LTE a Proximity-based Services (ProSe); Security aspects (3GPP TS 33.303 version 12.4.0 Release 12) (Year: 2015).*

(Continued)

Primary Examiner — Huy D Vu
Assistant Examiner — Nizam U Ahmed
(74) Attorney, Agent, or Firm — Schwegman Lundberg & Woessner, P.A.

(57) ABSTRACT

System and techniques for secure direct discovery UEs are described herein. A UE may initiate ProSe D2D discovery
(Continued)

and create a discovery request that includes an asserted identity in clear text and a message integrity code. The discovery request may then be transmitted in a D2D discovery channel.

14 Claims, 6 Drawing Sheets

Related U.S. Application Data filed on Aug. 13, 2015, provisional application No. 62/253,613, filed on Nov. 10, 2015.

(51) Int. Cl.
    *H04W 12/04*     (2009.01)
    *H04W 12/06*     (2009.01)
    *H04W 4/70*     (2018.01)
    *H04W 76/14*     (2018.01)

(52) U.S. Cl.
    CPC ........... *H04W 12/04* (2013.01); *H04W 12/06* (2013.01); *H04W 76/14* (2018.02)

(58) Field of Classification Search
    USPC ....................................................... 370/329
    See application file for complete search history.

(56) References Cited

FOREIGN PATENT DOCUMENTS

| WO | WO-2015046918 A1 | 4/2015 |
| WO | WO-2015105401 A1 | 7/2015 |
| WO | WO-2017027056 A1 | 2/2017 |

OTHER PUBLICATIONS

ETSI TS 133 303 V12.4.0 (Jul. 2015); Universal Mobile Telecommunications System (UMTS); LTE; Proximity-based Se' rvices (ProSe); Security aspects (Year: 2015).*

"International Application Serial No. PCT US2015 067088, International Preliminary Report on Patentability dated Feb. 22, 2018", 8 pgs.

"European Application Serial No. 15901164.2, Extended European Search Report dated Mar. 14, 2019", 8 pgs.

"European Application Serial No. 15901164.2, Response filed Oct. 1, 2018 to Communication pursuant to Rules 161(2) and 162 EPC dated Mar. 20, 2018", 8 pgs.

"International Application Serial No. PCT/US2015/067088, International Search Report dated May 3, 2016", 3 pgs.

"International Application Serial No. PCT/US2015/067088, Written Opinion dated May 3, 2016", 6 pgs.

"UMTS; LTE; ProSe; Security aspects", ETSI TS 133 303 v12.4.0, (Jul. 2015), 67 pgs.

* cited by examiner

SECURE DIRECT DISCOVERY AMONG USER EQUIPMENT

CLAIM OF PRIORITY

This patent application is a U.S. National Stage Application under 35 U.S.C. 371 from International Application No. PCT/US2015/067088, filed Dec. 21, 2015, published as WO 2017/027056, which claims the benefit of priority, under 35 U.S.C. § 119, to U.S. Provisional Application Ser. No. 62/203,598, titled "SECURITY FOR DIRECT DISCOVERY AMONG NON-AFFILIATED PUBLIC SAFETY USERS" and filed on Aug. 11, 2015; claims priority to U.S. Provisional Application Ser. No. 62/204,803, titled "SECURITY FOR GROUP MEMBER DISCOVERY AMONG AFFILIATED PUBLIC SAFETY USERS" and filed on Aug. 13, 2015; and also claims priority to U.S. Provisional Application Ser. No. 62/253,613, titled "SECURITY FOR DIRECT DISCOVERY AMONG NON-AFFILIATED PUBLIC SAFETY USERS" and filed on Nov. 10, 2015 the entirety of all are hereby incorporated by reference herein.

TECHNICAL FIELD

Embodiments described herein generally relate to wireless communications and more specifically to secure direct discovery among user equipment (UEs).

BACKGROUND

The third generation partnership project (3GPP) family of standards from release ten and onwards (e.g., through release thirteen) define protocols and mechanisms to implement wireless communications, such as cellular networks. Proximity services (ProSe) is a portion of these standards addressing a variety of direct inter-UE communications and facilities. A portion of the ProSe addresses communications between ProSe enabled devices for use by emergency workers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Although work has been conducted on 3GPP emergency services for out-of-coverage (OOC) UEs, ProSe group member discovery has not been addressed. Two situations arise in this context: 1) affiliated UEs; and 2) unaffiliated UEs. Affiliated UEs have been previously configured to be part of a ProSe group and share some security information for that group. Unaffiliated UEs have not been previously configured to be in a ProSe group and thus may not have the shared security information.

In both cases of the affiliated and unaffiliated UEs, the ProSe discovery channel presents some issues due to its limited information capacity. Generally, for example, the discovery cannot transmit a digital signature. To address the issues present in the current 3GPP standard in these regards, a system to provide a discovery request with a clear text asserted identity is herein disclosed. The discovery request may also include a message integrity code, used to ensure that the discovery request is not tampered with and also to use in later verifying the information in the discovery request. Finally, a direct frame number between communicating UEs may be used to provide a monotonic counter to prevent replay attacks in the absence of the core network (e.g., for OOC UEs).

Figure 1:
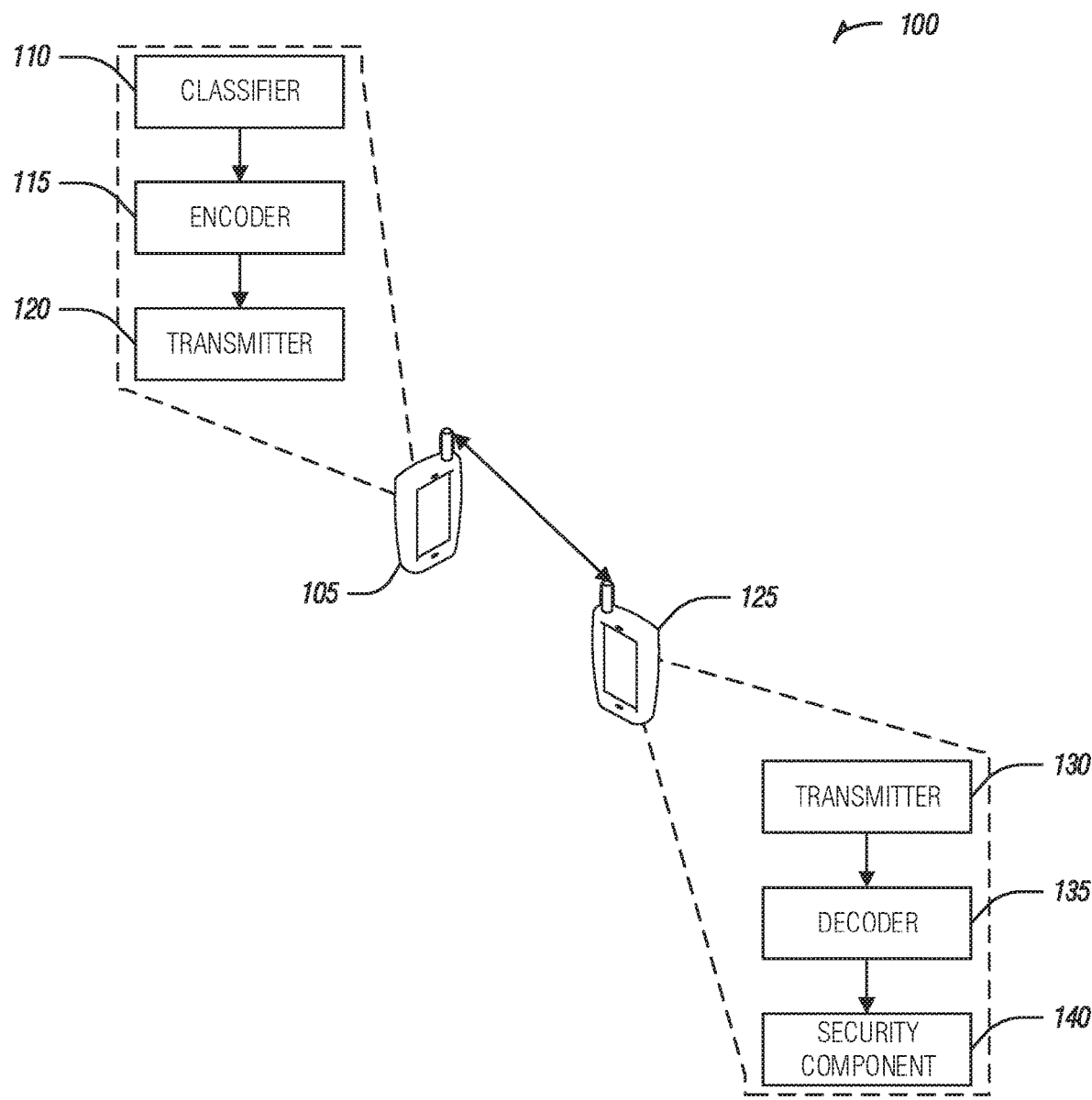
FIG. 1 is a block diagram of an example of an environment including a system for secure direct discovery among UEs, according to an embodiment.

FIG. 1 is a block diagram of an example of an environment 100 including a system for secure direct discovery among UEs, according to an embodiment. The environment 100 includes two UEs, UE 105 and UE 125. As described below, UE 105 is an initiator of the described discovery. However, in practice, any UE may perform these techniques to initiate discovery, much like any UE may perform the responder activities of UE 125.

The UE 105 includes a classifier 110, an encoder 115, and a transmitter 120. The classifier 110 is arranged to initiate a D2D discovery procedure via ProSe. In an example, D2D discovery is initiated based on an OOC scenario for the UE 105. That is, when UE 105 determines that it is OOC, the classifier 110 initiates the discovery procedure.

The encoder 115 is arranged to encode a discovery request that includes an asserted identity for the UE 105 in clear text (i.e., unencrypted but possibly encoded) and a message integrity code (MIC). In an example, the encoded discovery request is less than 233 bits. In an example, the MIC is calculated over an announcer info portion of the discovery request. That is, the announcer info portion is used as an input into the MIC creation mechanism, and thus contributes to the MIC's final form.

In an example, the MIC is computed with a monotonic counter derived from a layer-1 frame parameter. In an example, the monotonic counter is derived from a direct frame number carried in a physical sidelink broadcast channel (PSBCH). In an example, the direct frame number is carried in a MasterInformationBlock-SL data structure.

In an example, the encoder 115 is arranged to maintain an autonomous coarse UTC counter. In an example, the autonomous coarse UTC counter has a granularity (e.g., resolution) of 10.254 seconds. In an example, the encoder 115 is arranged to concatenate the autonomous course UTC counter with the Direct Frame Number. The encoder 115 may also be arranged to use a truncated portion of the concatenated result (e.g., number, string, etc.) for computing encryption or integrity checks (e.g., the MIC).

The transmitter 120 is arranged to communicate the discovery request, for example, to UE 125. In an example, the UE is affiliated with a ProSe group. Here the asserted identity may be a discovery group (e.g., ProSe discovery group) identifier—e.g., obtained by the UE 105 prior to discovery in discovery group attributes—and the MIC may apply to portions of the discovery request. In an example, wherein the discovery group identifier is a pointer to a corresponding discovery key in the discovery group attributes, the discovery key usable to decrypt encrypted portions of the discovery request.

In an example, the UE 105 is unaffiliated with a ProSe group. Here, the clear text security identifier may be a user identity and the MIC may be calculated using a UE-specific discovery key. In an example, the UE 105 may also include a decoder (not shown) arranged to decode a mutual authentication message from a device (e.g., UE 125) that is received via the transmitter 120 in a D2D/ProSe communication channel in response to the discovery request. In this example, the encoder 115 may be arranged to encode the UE-specific discovery key and the transmitter 120 may be arranged to transmit the encoded UE-specific discovery key to the device in response to the mutual authentication message.

In an example, the decoder may also be arranged to, in the case of a failed decryption or integrity check, try again by at least one of increasing or decreasing the autonomous coarse UTC counter by one, re-creating the concatenated result with the new value, and trying the decryption or integrity check again.

UE 125 includes a transmitter 130, a decoder 135, and a security component 140. The transmitter 130 is arranged to receive a discovery message in a device-to-device (D2D) discovery channel from a device (e.g., UE 105). In an example, the discovery message is less than or equal to 233 bits.

The decoder 135 is arranged to extract an identity and a message integrity code (MIC) from the discovery message. In an example, the MIC is calculated from a direct frame number stored in a MasterInformationBlock-SL data structure transmitted in a PSBCH. In an example, the discovery message includes a type field with a value of solicitation. In an example, the discovery message includes a type field with a value of response and a discoveree info field with a value including a user identity of the UE. The user identity is of the user and not the UE (e.g., not the layer-2 identity of the UE). In an example, the identity is a discovery group identification (ID), and wherein the MIC is decoded using a locally stored shared key corresponding to the group discovery ID and fields of the discovery message.

The security component 140 is arranged to control the transmitter 130 to perform a mutual authentication with the device in response to extracting the identity and the MIC. The security component 140 is also arranged to use results of the mutual authentication to verify identity of device in future D2D communications.

Figure 2:
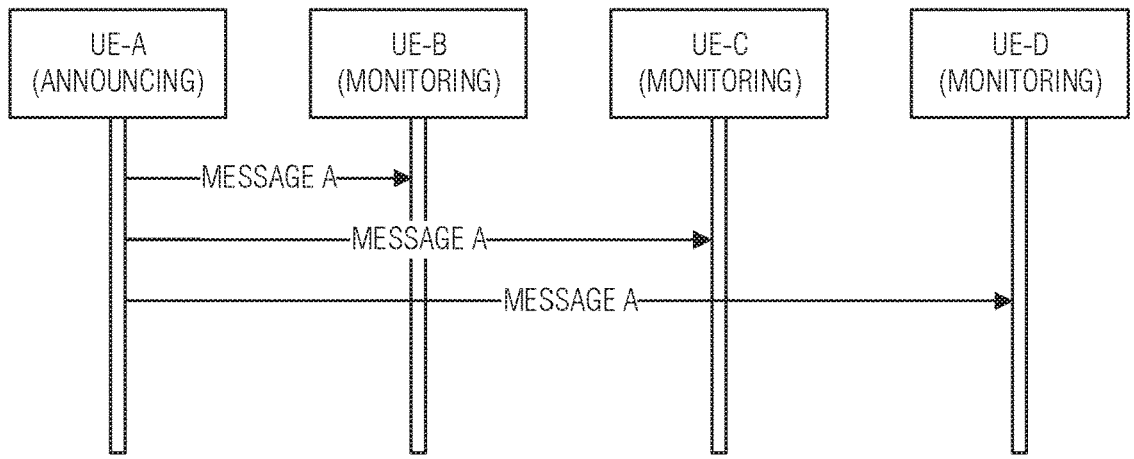
FIG. 2 illustrates an example of a method for secure direct discovery UEs, according to an embodiment.
Figure 3:
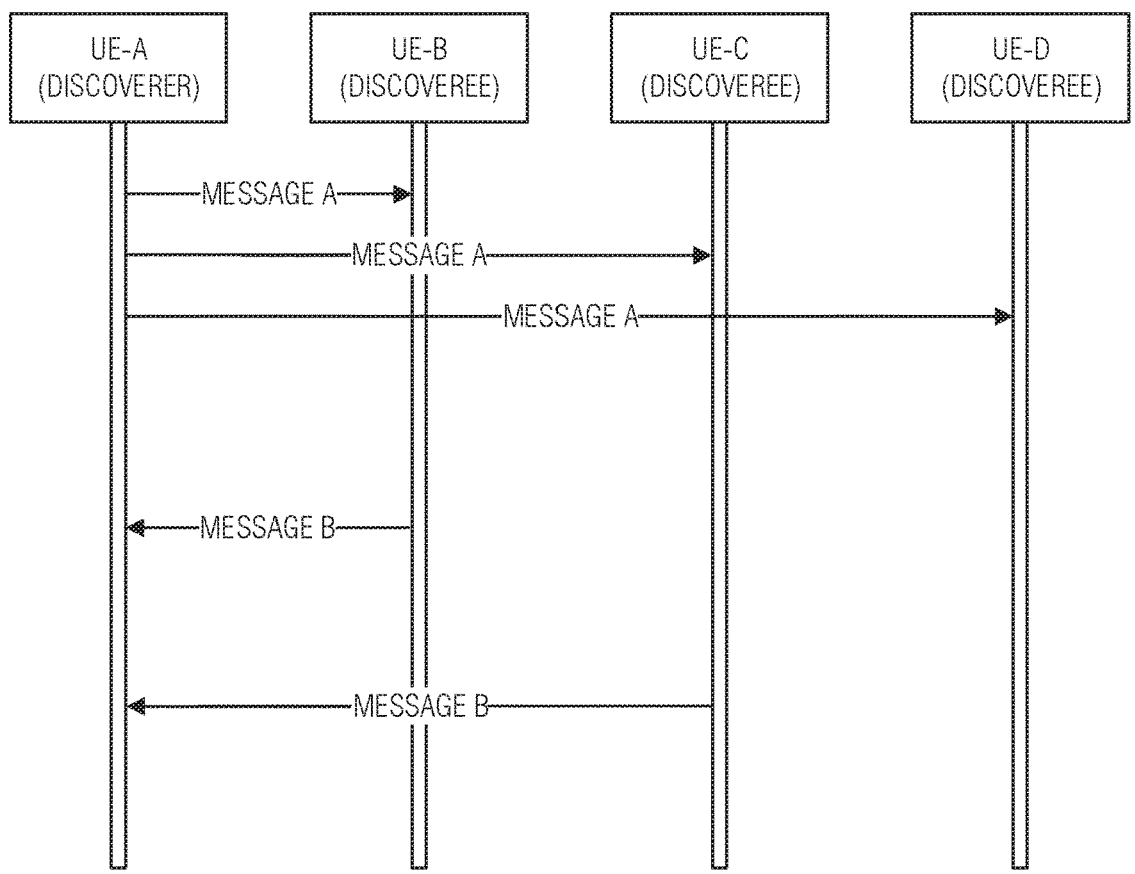
FIG. 3 illustrates an example of a method for secure direct discovery UEs, according to an embodiment.
Figure 4:
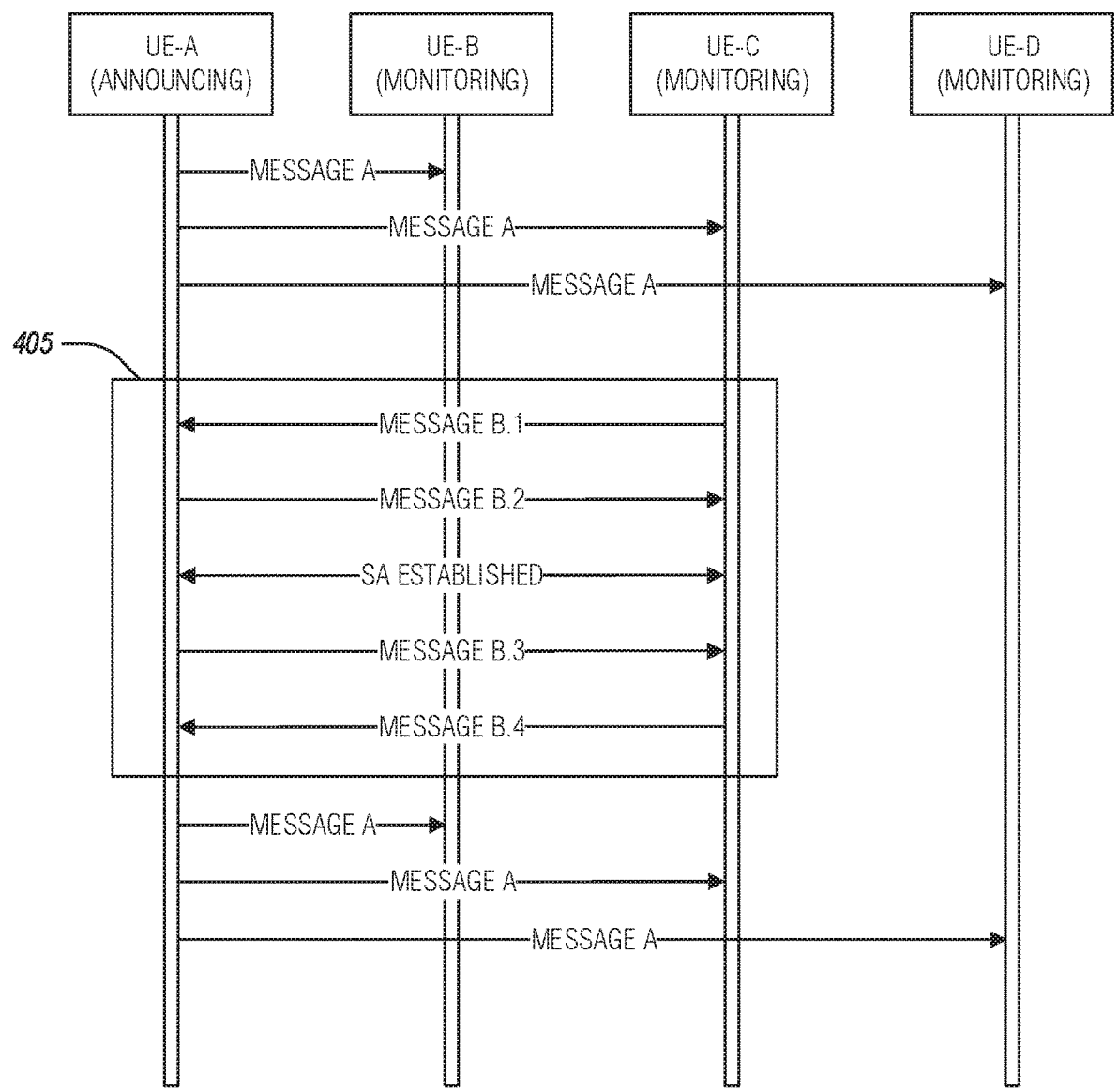
FIG. 4 is a message passing diagram illustrating an example of a communication for secure direct discovery UEs, according to an embodiment.

FIGS. 2-4 illustrate different aspects of the details discussed above with communication flows. These flows cover both Model A and Model B interactions for both affiliated and unaffiliated UEs. Generally, both affiliated and unaffiliated UEs employ the communications flow of FIG. 4 for Model A and the communications flow of FIG. 5 for Model B, but vary in the clear text content of their messages. FIG. 6 illustrates a verification communications flow for unaffiliated UEs. The example setup for these communications flows is as follows:

Among Affiliated Ues

An Announcing (Model A) or Discoverer/Discoveree (Model B) UE uses a Discovery Key in specified cryptographic algorithms to protect all or certain parameters of the discovery message. The cryptographic algorithms may be used to provide encryption (cipher) or MIC for all or specified portion of the discovery message. In an example, Model A or Model B UEs use the Direct Frame Number (e.g., 10-bit counter, carried in PSBCH (MasterInformationBlock-SL), as a monotonic counter (e.g., due to lack of UTC based timestamp) in the specified cryptographic algorithms to support replay attack mitigation. A Discovery Group identifier includes in the discovery message is sent as clear text and is used as a pointer to the Discovery Key for a receiving UE. Given the wrap-around time of 10.24 seconds of the Direct Frame Number, to prevent frequent replay attacks the Direct Frame Number may be combined with the UE's internal UTC clock (typically implemented as a 39-bit counter) by replacing the 10 least significant bits of the UTC counter with the 10 bits of the Direct Frame Number.

The UE is configured with a ProSe Discovery Group Key (PDGK) for a given Discovery Group ID by the ProSe Key Management Function, similar to the configuration of ProSe Group Key (PGK) for a given Group ID (e.g., ProSe Group Layer-2 ID) as described in 3GPP Rel-12 TS 33.303 clause 6. If the Discovery Group is the same as the ProSe Group used for one-to-many ProSe Direct Communication then PGK and ProSe Group Layer-2 ID can be used as PDGK and Discovery Group ID, respectively. The ProSe Key Management Function also provides the UE with supported encryption and Message Integrity Code algorithms for each Discovery Group based on a local policy. The UE may be configured with one or more Discovery Group IDs.

The Discovery Key is calculated using a specified KDF (Key Derivation Function)—whose underlying algorithm is outside the scope of this disclosure. A primary input to this KDF is the PDGK. In an example, one or all of the Group Member Identity (i.e. Layer 2 ID of the sending UE), Discovery Key Identity (e.g., 16-bit counter), and Discovery Group ID are inputs to the specified KDF. Generally, the Discovery Key is specific to a Discovery Group.

In an example, one or more of the following may be used as identifiers for group member discovery. The following parameters may be used in the Group Member Discovery Announcement message (Model A):

ProSe UE ID: link layer identifier that is used for subsequent direct communication.

Announcer Info: provides information about the announcing user.

Layer-2 Discovery Group ID (e.g., Discovery Group ID): link layer identifier of the group that the UE belongs to.

The following parameters may be used in the Group Member Discovery Solicitation message (Model B):

Discoverer Info: provides information about the discoverer user.

Layer-2 Discovery Group ID (e.g., Discovery Group ID): link layer identifier of the group that the targeted UE should belong to.

Target Info: provides information about the targeted discoverees (single user or group). The Target Info is provided by the upper layers of the UE.

The following parameters may be used in the Group Member Discovery Response message (Model B):

ProSe UE ID: link layer identifier that is used for subsequent direct communication.

Discoveree Info: provides information about the discoveree.

Layer-2 Discovery Group ID: link layer identifier of the group that the discoveree UE belongs to.

In the case where the Direct Frame Number is used in integrity or encryption to secure the communication (e.g., against replay attacks). The UE is configured with supported integrity and encryption algorithms during the UE configuration phase with the ProSe Key Management Function. The Direct Frame Number (10-bit counter, carried in PSBCH (MasterInformationBlock-SL) is used in the supported Message Integrity Code algorithm to support replay attack mitigation, as well as in the encryption algorithm to support confidentiality.

The Direct Frame Number is a 10-bit counter with 10 ms granularity, giving it a wrap-around (e.g., repeating) time of 10.24 seconds. To use this number to prevent replay attacks, the Direct Frame Number may be combined with the UE's internal UTC clock as follows: the UTC clock in UEs is typically implemented as a 39-bit counter with 1 ms granularity, following the encoding defined in TS 36.331 (refer to table on System Information Block 16). When OOC, the UE may increment the UTC counter autonomously, but may soon run out of sync with (e.g., drift with respect to) adjacent UEs. For example, an internal clock with fifty parts per million accuracy will accumulate three milliseconds of drift after one minute of autonomous operation, or one hundred and eighty milliseconds of drift after one hour of autonomous operation. With such imperfect clock the integrity and encryption algorithms cannot work.

To address these clock issues in OOC situations, the UE may create a "Coarse UTC counter" with a granularity of 10.24 seconds by truncating the 10 least significant bits of the internal (imperfect) UTC counter. The "Coarse UTC counter" is increased by one every 10.24 seconds. The UE then concatenates the "Course UTC counter" with the 10-bit Direct Frame Number to create a "Pretty good UTC counter" for OOC use. Further, for the integrity check or encryption algorithms, the UE may use the X least significant bits of the "Pretty good UTC counter," where X is any number that is deemed sufficient for countering replay attacks (e.g., 10<X<39).

With this approach, the UEs are sufficiently synchronized in the lowest 10 bits of the "Pretty good UTC counter,", but may occasionally diverge in the "Course UTC counter" by a value of +/−1 (e.g., due to border effects where the cumulated drift makes a difference in the individual UEs' "Course UTC counter"). For this reason, when the decryption or integrity check of the received message fails, the receiver may make up to two more attempts using a "Pretty good UTC counter" value that is either increased or decreased by one, along with the same Direct Frame Number. This guarantees that any border effects are addressed.

Among Unaffiliated Ues

Due to the lack of clear Stage 1 requirements for Public Safety discovery in 3GPP TS 22.278, it is currently unclear whether the procedures for ProSe Group Member Discovery apply to "affiliated" Public Safety users only (e.g. Public Safety users that are configured to belong to the same ProSe Group that is used for one-to-many ProSe Direct Communication, which also means that they share a common group security credential in common), or whether it can also be used for discovery of non-affiliated Public Safety users (i.e. Public Safety users that do not share "group information" of any kind with the other users).

This lack of clarity gives rise to some issues. For example, consider a "mutual aid" scenario, where the local police forces in country A are assisted by a police squad from another country (country B) who have been dispatched to country A to help. Police officer B-1 from country B is missing in action (e.g., trapped in a tunnel). Police officers of both country A and country B start the search for officer B-1. While police officers from country B (e.g., some or all of them) have been configured to belong to the same ProSe Group as officer B-1, none of the police officers from country A have been configured to belong to the same ProSe Group as officer B-1. Nevertheless, police officers from country A may still be able to discover officer B-1, as long as, for example, the latter advertises its user identity as clear text.

Due to the absence of common group information, including any common security related credentials, the procedure for Public Safety discovery among non-affiliated Public Safety users is performed by asserting a user identity (e.g., Announcer Info for Model A or Discoverer or Discoveree Info for Model B) in clear text. Proof-of-identity will typically be presented in the form of a digital signature or a digital certificate. However. 3GPP made a working assumption that Public Safety discovery in OOC scenarios will be based on the ProSe/D2D Discovery channel (instead of the ProSe/D2D Communication channel). The message size on the ProSe/D2D Discovery channel is limited to 232 bits which prohibits using a digital signature because the digital signature alone is 512 bits long (and the size of digital certificates is even bigger).

Top address these issues in unaffiliated users, the following features may be implemented. The user identity in all discovery messages (e.g., Announcer Info in the Announcement or Discoverer Info and Discoveree Info in the Solicitation and Response messages respectively) are transmitted as clear text. The discovery message used includes a MIC that is computed using a UE specific Discovery Key.

Initially, the receiving UE is unable to check whether the MIC includes in a received discovery message is valid or not because it does not have the sender's UE-specific Discovery Key. Therefore, if the receiving UE is interested in verifying the sender's user identity (e.g., Announcer Info or Discoverer Info), it engages in mutual authentication and establishment of a security association (e.g., common credential and agreed security algorithm to establish an encrypted session) with the sender UE. Due to the amount of signaling involved and the size of the exchanged parameters (e.g. digital signatures or digital certificates), the authentication is performed over the ProSe/D2D Communication channel instead of the discovery channel. In the process the two UEs exchange their UE-specific Discovery Keys.

Using the established Security Association, the two UEs exchange their UE-specific Discovery Keys used for protecting the discovery messages they sent. With Model A discovery, this may be a one-way exchange, for example, the announcing UE sending its Discovery Key to the monitoring UE. For subsequent discovery messages exchanged between the two UEs, the UEs are able to check whether the MIC includes in the received discovery message is valid or not because they have exchanged UE-specific keys. Therefore, they are able to continuously inform each other of their presence in a secure way, without having to fallback to a mutual authentication again.

In an example, the MIC is calculated using the sender's UE-specific Discovery Key over all or a subset of fields in the discovery message. The MIC calculation may also use the Direct Frame Number as a monotonic counter in the integrity check algorithm to support replay attack mitigation, as described above with respect to the affiliated UEs.

FIG. 2 is a message passing diagram illustrating an example of a communication 200 for secure direct discovery UEs, according to an embodiment. The communication 200 implements Model A, or an Announcer, paradigm in which UE-A announces its asserted identity (e.g., ProSe Discovery Group ID or user identity) to other UEs, such as UE-B, UE-C, or UE-D.

UE-A (in the role of "announcing UE") periodically transmits a discovery message (e.g., message A) including one or more of the following parameter settings:

Type: Announcement

Discovery Type: Group Member Discovery

Disco Group ID: identifier of the Discovery Group. It is sent as clear text and is used as a pointer to the Discovery Key for affiliated UEs.

Announcer Info: upper layer information about the user of the announcing UE.

ProSe UE ID: the Layer-2 ID of the announcing UE. This may be sent in clear text for unaffiliated UEs.

MIC Value: MIC of the Announcement message using one of the supported MIC algorithms. The MIC may be computed over all or a subset of the parameters in the message. In an example, the MIC is at least computed over the Announcer Info parameter.

Encrypted Information: encryption can be applied to provide privacy over the Announcer Info (i.e. user's identity) and over the ProSe UE ID (i.e. the layer-2 identifier of UE-A).

In an affiliated scenario, for example between UE-A and UE-B, upon reception of the Announcement message (e.g., message A), UE-B (in the role of a "monitoring UE") verifies the MIC value of payload. If the verification test is successful, UE-B decrypts the message (if encryption has been applied) and presents UE-1's user identity ("Announcer Info") to the user of UE-B, as well as the UE-1's layer-2 identifier ("ProSe UE ID").

In an unaffiliated scenario, for example, between UE-A and UE-C, upon reception of the Announcement message (e.g., message A), UE-C (in the role of "monitoring UE") determines that it is interested in the asserted identity (Announcer Info), however, it is unable to verify the MIC value because it does not have the UE-specific Discovery Key of UE-A. Thus, UE-C triggers a full-blown mutual authentication with UE-A by presenting a proof-of-identity e.g. in the format of digital signature or digital certificate. Due to the size of the digital signature it is assumed that the full authentication is performed over the ProSe/D2D communication channel. In the process the two UEs exchange their UE-specific Discovery Keys that are used for calculation of the MIC. Additional details of this procedure are discussed below with respect to FIG. 4.

FIG. 3 is a message passing diagram illustrating an example of a communication 300 for secure direct discovery UEs, according to an embodiment. The communication 300 implements Model B, or a Discoverer/Discoveree, paradigm in which UE-A requests the asserted identities (e.g., ProSe Discovery Group ID or user identity) of other UEs, such as UE-B, UE-C, or UE-D, who then respond with those identities.

UE-A (in the role of "discoverer"), wishing to discover group members in vicinity, transmits a discovery message (e.g., message A) that includes one or more of the following fields (e.g., parameters):

Type: Solicitation

Discovery Type: Group Member Discovery

Disco Group ID: identifier of the Discovery Group. It is sent as clear text and is used as a pointer to the Discovery Key in the affiliated case.

Discoverer Info: upper layer information about the user of UE-A.

Target Info: upper layer information identifying the targeted discoverees (single user or group of users).

ProSe UE ID: the Layer-2 ID of the discoverer UE. This may be sent as clear text in the unaffiliated case, but not the affiliated case.

MIC Value: MIC of the of the Solicitation message using one of the supported MIC algorithms. The MIC may be computed over all or a subset of the parameters in the message. In an example, the MIC is at least computed over the Discoverer Info parameter.

Encrypted Information: encryption can be applied to provide privacy over the Discoverer Info (i.e. user's identity) and over the ProSe UE ID (i.e. the layer-2 identifier of UE-A)

In an affiliated case, upon reception of the Solicitation message (e.g., message A), UE-B (in the role of "discoveree") checks whether it is concerned by the message by inspecting the Discovery Group ID parameter and then verifies the MIC value of payload. If the verification test is successful, UE-B checks the Target Info parameter to see if it belongs to the set of targeted discoverees. If the verification passes, UE-B responds with a discovery message (e.g., message B) including one or more of the following fields:

Type: Response

Discovery Type: Group Member Discovery

Disco Group ID: identifier of the Discovery Group. It is sent as clear text and is used as a pointer to the Discovery Key.

Discoveree Info: upper layer information identifying the user of UE-B.

ProSe UE ID: the Layer-2 ID of the discoveree UE.

MIC Value: MIC of the of the Solicitation message using one of the supported MIC algorithms. The MIC may be computed over all or a subset of the parameters in the message. In an example, the MIC is at least computed over the Discoveree Info parameter.

Encrypted Information: encryption can be applied to provide privacy over the Discoveree Info (i.e. user's identity) and over the ProSe UE ID (i.e. the layer-2 identifier of UE-B)

In an example, the Discovery Group ID may be encoded as part of the Discoverer Info or Discoveree Info field. In an example, the Discovery Group ID may be used only in the Solicitation message, whereas its value is inferred in the Response message by some other mechanism, such as by using a transaction identifier that links the Response message to a specific Solicitation message, or the like.

The above techniques are also applicable to other 3GPP public discovery applications. In addition to Group Member Discovery, 3GPP TR 23.713 defines two other types of Public Safety Discovery: 1) ProSe UE-to-Network Relay Discovery (TR 23.713 clause 6.1.2.2); and 2) ProSe UE-to-UE Relay Discovery (TR 23.713 clause 6.1.2.4). Additionally, although the example given throughout generally relate to Long Term Evolution (LTE) cellular standards of 3GPP, they may also be used for other device to device technologies, such as Wi-Fi Direct.

In the unaffiliated case, the return message (e.g., message B) is eschewed in favor of mutual authentication, as described below with respect to FIG. 4.

FIG. 4 is a message passing diagram illustrating an example of a communication 400 for secure direct discovery UEs, according to an embodiment. Although the communications 200 and 300 partially applied to unaffiliated UE discovery, the additional operations of mutual authentication of UEs outside of the discovery channel are different. Whether Model A or Model B is implemented in the unaffiliated case, the secondary message, message B, varies only in the message type and whether or not the responding UE is targeted by the originally transmitting UE. With this in mind, the entire procedure for unaffiliated UEs may proceed as follows.

Message A: proceed as described above with respect to FIG. 2 or 3. Upon reception of the Solicitation or Announcement message, UE-C determines that it is unable to verify the MIC value because it does not have the UE-specific Discovery Key of UE-A. Accordingly, UE-C triggers a full-blown mutual authentication (405) with UE-A by presenting a proof-of-identity e.g. in the format of digital signature or digital certificate. Due to the size of the digital signature it is assumed that the full authentication is performed over the ProSe/D2D communication channel. In the process the two UEs exchange their UE-specific Discovery Keys that are used for calculation of the MIC.

Message B: the mutual authentication portion 405 (e.g., mutual authentication+security association (SA) establishment +secure discovery key exchange) of the communication 400. At message B.1. UE-C transmits an Authentication Request (e.g., proof-of-identity). At message B.2, UE-A transmits an Authentication Response (e.g., proof-of-identity). At this point, a security association is established between UE-A and UE-C. At message B.3, UE-A transmits its UE-specific discovery key, and at message B.4, UE-C reciprocates with its UE-specific discovery key.

Message is later periodically repeated, as illustrated. However, in contrast to the first transmission of Message A, UE-3 is now able to validate the MIC in the received Solicitation or Announcement message due to learning the UE-specific Discovery Key of UE-A in the communication portion 405. Thus, upon reception of subsequent Solicitation message of Model B, for example, UE-C (in the role of "discoveree") may check whether it is concerned by the message by inspecting the Target Info parameter and then verify the MIC value of payload. If the verification is successful, UE-C responds with a discovery message (which may be entirely encrypted) with one or more the following parameter settings:

Type: Response
Discovery Type: Non-affiliated User Discovery
Discoveree Info: upper layer information identifying the user of UE-C.
ProSe UE ID: the Layer-2 ID of the discoveree UE.
MIC Value ProSe Group Member Discovery for Public Safety should be usable when UEs are out of network coverage. This situation leads to no real-time availability of a common root of trust. Additionally, this situation results in no common synchronization source (e.g., UTC based timestamp). This disclosure introduces a Discovery Key and an innovative way for UEs to derive a monotonic counter (in absence of UTC based timestamp) required to protect ProSe Group Member Discovery messages (in out of Coverage scenario) for Public Safety use. Thus, the throughout provide an elegant solution to these problems.

Figure 5:
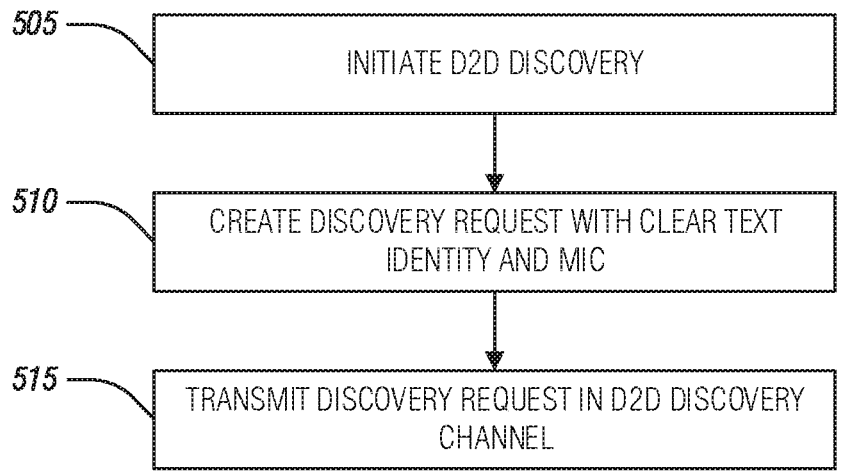
FIG. 5 is a message passing diagram illustrating an example of a communication for secure direct discovery UEs, according to an embodiment.
Figure 6:
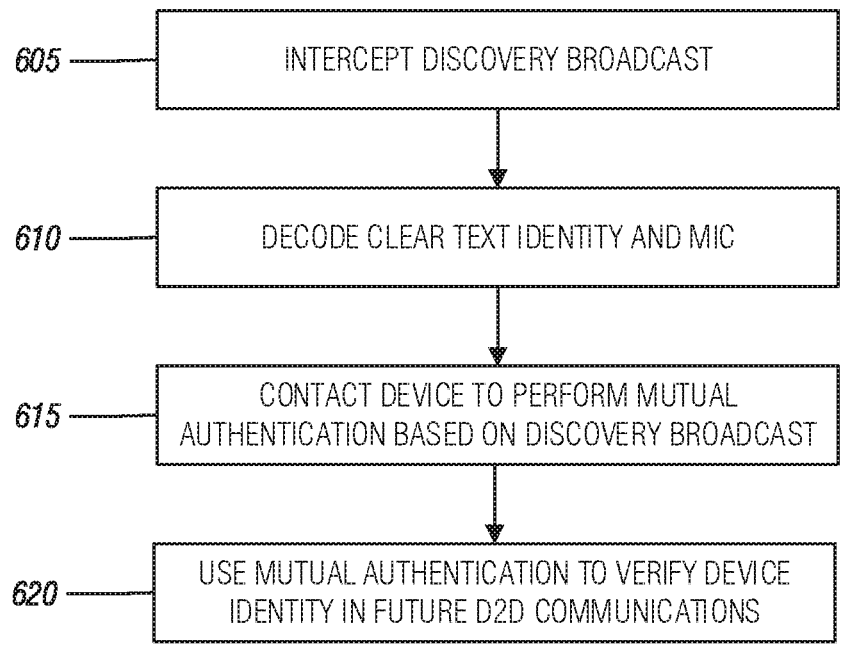
FIG. 6 is a message passing diagram illustrating an example of a communication for secure direct discovery UEs, according to an embodiment.

FIG. 5 illustrates an example of a method 500 for secure direct discovery UEs, according to an embodiment. The operations of the method 500 are performed by computer hardware, such as that described above with respect to FIG. 1, or below with respect to FIG. 7 or 8 (e.g., circuit sets). In an example, the operations of the method 500 are performed by a UE initiating discovery, such as announcing in Model A or soliciting in Model B.

At operation 505, proximity services (ProSe) device-to-device (D2D) discovery is initiated when the UE is out-of-coverage.

At operation 510, a discovery request with an asserted identity in clear text and a MIC is created. In an example, the discovery request is less than 233 bits. In an example, the MIC is calculated over an announcer info field of the discovery request. In an example, the UE is affiliated with a ProSe group. In this example, the asserted identity may be a discovery group identifier that the UE obtained as part of discovery group attributes prior to discovery. Further, the MIC applies to portions of the discovery request. In an example, the discovery group identifier is a pointer to a corresponding discovery key in the discovery group attributes. In an example, the discovery key usable to decrypt encrypted portions of the discovery request.

In an example, the UE is unaffiliated with a ProSe group. In this example, the clear text security identifier may be a user identity and the MIC is calculated using a UE-specific discovery key. In an example, the MIC is computed with a monotonic counter derived from a layer-1 frame parameter. In an example, the monotonic counter is derived from a direct frame number carried in a physical sidelink broadcast channel (PSBCH). In an example, the direct frame number is carried in a MasterInformationBlock-SL data structure.

In an example, the method 500 may be extended to include maintaining an autonomous coarse UTC counter. In an example, the autonomous coarse UTC counter has a granularity (e.g., resolution) of 10.254 seconds. In an example, the method 500 may be extended to include: concatenating the autonomous course UTC counter with the Direct Frame Number; and using a truncated portion of the concatenated result (e.g., number, string, etc.) for computing encryption or integrity checks. In an example, in the case of a failed decryption or integrity check, the method 500 may be extended to try again by at least one of increasing or decreasing the autonomous coarse UTC counter by one, re-creating the concatenated result with the new value, and trying the decryption or integrity check again.

At operation 515, the discovery request is transmitted in a D2D discovery channel. In an example, the method 500 may be extended to include receiving a mutual authentication message from a device that is received via the transmitter in a D2D/ProSe communication channel—which is not a discovery channel—in response to the discovery request. In an example, an encoder may encode the UE-specific discovery key which is then transmitted to the device in response to the mutual authentication message.

FIG. 6 illustrates an example of a method 600 for secure direct discovery UEs, according to an embodiment. The operations of the method 600 are performed by computer hardware, such as that described above with respect to FIG. 1, or below with respect to FIG. 7 or 8 (e.g., circuit sets). In an example, the method 600 is performed by a UE that is receiving an initial message from another UE (e.g., receiving an announcement or being a discoveree).

At operation 605, a discovery broadcast in a device-to-device (D2D) discovery channel from a device is intercepted (e.g., received). In an example, the discovery broadcast includes a data structure that is less than or equal to 233 bits. In an example, the discovery broadcast includes a type field with a value of solicitation. In an example, the discovery broadcast includes a type field with a value of announcement.

At operation 610, an identity and a message integrity code (MIC) are decoded from the discovery broadcast. In an example, the MIC cryptographically uses a direct frame number stored in a MasterInformationBlock-SL data structure transmitted in a physical sidelink broadcast channel (PSBCH) as a monotonic counter.

At operation 615, the device is contacted to perform a mutual authentication based on the discovery broadcast.

At operation 620, results of the mutual authentication are used to verify identity of device in future D2D communications.

Figure 7:
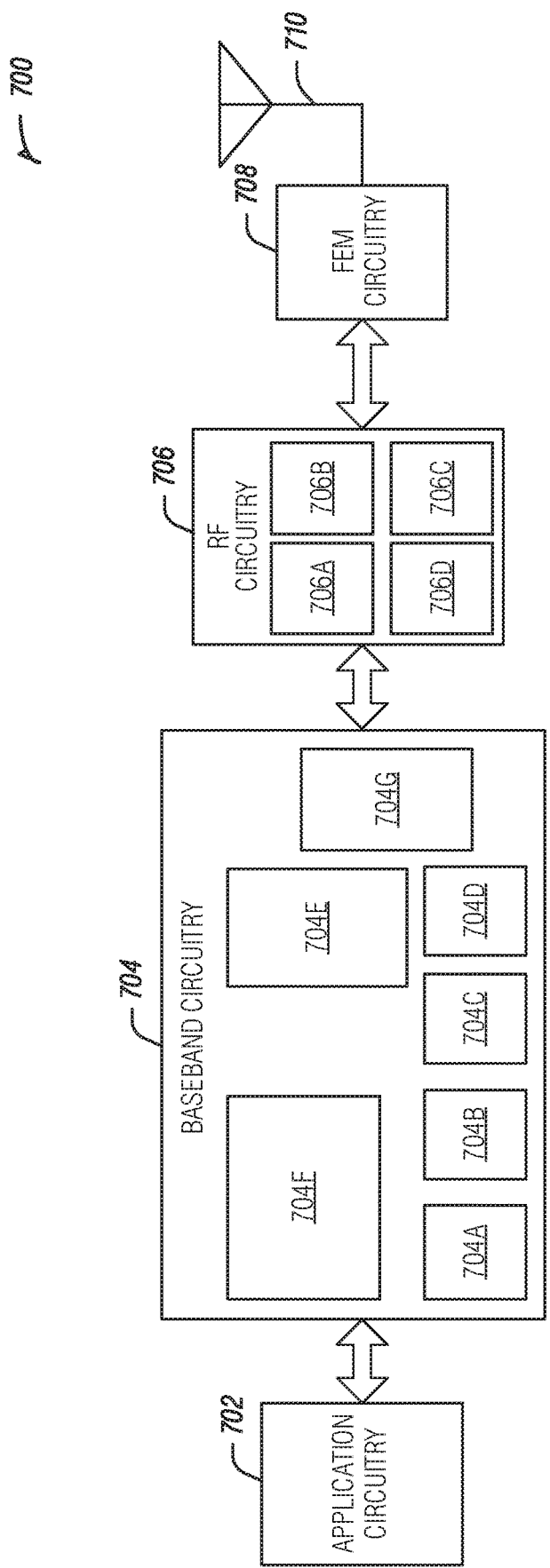
FIG. 7 is a block diagram of an example of a UE upon which one or more embodiments may be implemented.

FIG. 7 is a block diagram of an example of a UE 700 upon which one or more embodiments may be implemented. In an example, the UE 700 may include application circuitry 702, baseband circuitry 704, Radio Frequency (RF) circuitry 706, front-end module (FEM) circuitry 708 and one or more antennas 710, coupled together at least as shown. As used with reference to FIG. 7, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, the baseband circuitry 704 may include a second generation (2G) baseband processor 704*a*, third generation (3G) baseband processor 704*b*, fourth generation (4G) baseband processor 704*c*, and/or other baseband processor(s) 704*d* for other existing generations, generations in development or to be developed in the future (e.g., fifth generation (5G), 6G, etc.). The baseband circuitry 704 (e.g., one or more of baseband processors 704*a-d*) may handle various radio control functions that enable communication with one or more radio networks via the RF circuitry 706. The radio control functions may include, but are not limited to, signal modulation/demodulation, encoding/decoding, radio frequency shifting, etc. In an example, modulation/demodulation circuitry of the baseband circuitry 704 may include Fast-Fourier Transform (FFT), precoding, and/or constellation mapping/demapping functionality. In an example, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In an example, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements used in combination with memory 704*g*. A central processing unit (CPU) 704*e* of the baseband circuitry 704 may be configured to run elements of the protocol stack for signaling of the PHY, MAC, RLC, PDCP and/or RRC layers. In an example, the baseband circuitry may include one or more audio digital signal processor(s) (DSP) 704*f*. The audio DSP(s) 704*f* may include elements for compression/decompression and echo cancellation and may include other suitable processing elements in other embodiments. In an example, components of the baseband circuitry may be suitably combined in a single chip, a single chipset, or disposed on a same circuit board. In an example, some or all of the constituent components of the baseband circuitry 704 and the application circuitry 702 may be implemented together such as, for example, on a system on a chip (SOC).

In an example, the baseband circuitry 704 may provide for communication compatible with one or more radio technologies. For example, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In an example, the RF circuitry 706 may include a receive signal path and a transmit signal path. The receive signal path of the RF circuitry 706 may include mixer circuitry 706*a*, amplifier circuitry 706*b* and filter circuitry 706*c*. The transmit signal path of the RF circuitry 706 may include filter circuitry 706*c* and mixer circuitry 706*a*. RF circuitry 706 may also include synthesizer circuitry 706*d* for synthesizing a frequency for use by the mixer circuitry 706*a* of the receive signal path and the transmit signal path. In an example, the mixer circuitry 706*a* of the receive signal path may be configured to down-convert RF signals received from the FEM circuitry 708 based on the synthesized frequency provided by synthesizer circuitry 706*d*. The amplifier circuitry 706*b* may be configured to amplify the down-converted signals and the filter circuitry 706*c* may be a low-pass filter (LPF) or band-pass filter (BPF) configured to remove unwanted signals from the down-converted signals to generate output baseband signals. Output baseband signals may be provided to the baseband circuitry 704 for further processing. In an example, the output baseband signals may be zero-frequency baseband signals, although this is not a requirement. In an example, mixer circuitry 706a of the receive signal path may comprise passive mixers, although the scope of the embodiments is not limited in this respect.

In an example, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In an example, the mixer circuitry 706a of the receive signal path and the mixer circuitry 706a of the transmit signal path may include two or more mixers and may be arranged for quadrature downconversion and/or upconversion respectively. In an example, the mixer circuitry 706a of the receive signal path and the mixer circuitry 706a of the transmit signal path may include two or more mixers and may be arranged for image rejection (e.g., Hartley image rejection). In an example, the mixer circuitry 706a of the receive signal path and the mixer circuitry 706a may be arranged for direct downconversion and/or direct upconversion, respectively. In an example, the mixer circuitry 706a of the receive signal path and the mixer circuitry 706a of the transmit signal path may be configured for super-heterodyne operation.

In an example, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In a dual-mode example, a separate radio IC circuitry may be provided for processing signals for each spectrum, although the scope of the embodiments is not limited in this respect.

In an example, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In an example, the synthesizer circuitry 706d may be a fractional N/N+1 synthesizer.

In an example, frequency input may be provided by a voltage controlled oscillator (VCO), although that is not a requirement. Divider control input may be provided by either the baseband circuitry 704 or the applications processor 702 depending on the desired output frequency. In an example, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In an example, the divider may be a dual modulus divider (DMD) and the phase accumulator may be a digital phase accumulator (DPA). In an example, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In an example, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In an example, the output frequency may be a LO frequency (fLO). In an example, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In an example, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In an example, the UE 700 may include additional elements such as, for example, memory/storage, display, camera, sensor, and/or input/output (I/O) interface.

Figure 8:
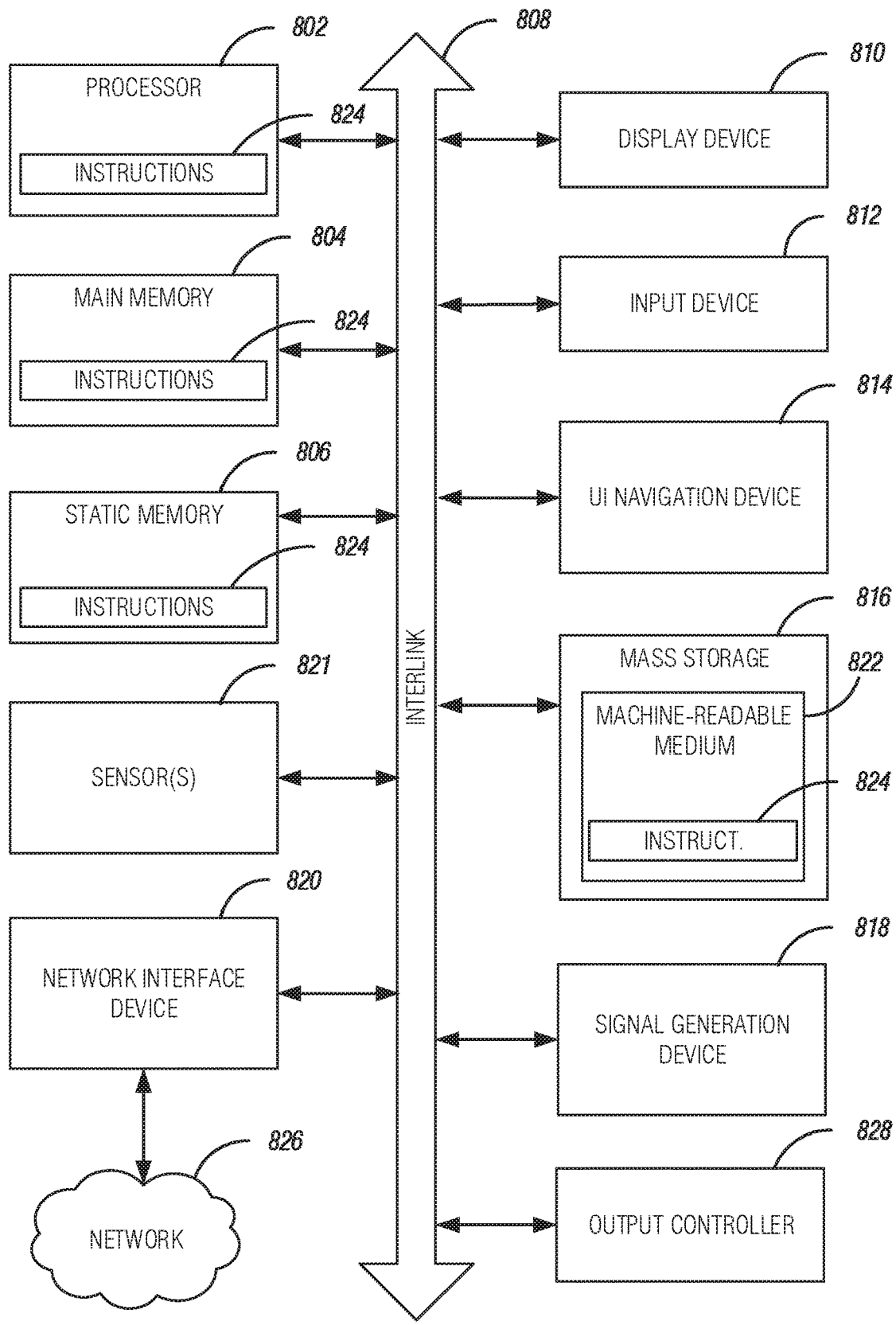
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

Example 1 is an apparatus of a user equipment (UE), the apparatus for secure direct discovery among UEs, the apparatus comprising: a classifier to initiate a device-to-device discovery procedure via proximity services (ProSe); an encoder to encode a discovery request that includes an asserted identity in clear text and a message integrity code (MIC); and a transmitter to communicate the discovery request.

In Example 2, the subject matter of Example 1 optionally includes wherein the encoded discovery request is less than 233 bits.

In Example 3, the subject matter of any one or more of Examples 1-2 optionally include wherein the MIC is calculated over an announcer info portion of the discovery request.

In Example 4, the subject matter of any one or more of Examples 1-3 optionally include wherein the MIC is computed with a monotonic counter derived from a layer-1 frame parameter.

In Example 5, the subject matter of Example 4 optionally includes wherein the monotonic counter is derived from a direct frame number carried in a physical sidelink broadcast channel (PSBCH).

In Example 6, the subject matter of Example 5 optionally includes wherein the direct frame number is carried in a MasterInformationBlock-SL data structure.

In Example 7, the subject matter of any one or more of Examples 1-6 optionally include wherein the UE is affiliated with a ProSe group, wherein the asserted identity is a ProSe discovery group identifier, the UE including ProSe discovery group attributes prior to discovery, and wherein the MIC applies to portions of the discovery request.

In Example 8, the subject matter of Example 7 optionally includes wherein the ProSe discovery group identifier is a pointer to a corresponding discovery key in the ProSe discovery group attributes, the discovery key usable to decrypt encrypted portions of the discovery request.

In Example 9, the subject matter of any one or more of Examples 1-8 optionally include wherein the UE is unaffiliated with a ProSe group, wherein the clear text security identifier is a user identity, and wherein the MIC is calculated using a UE-specific discovery key.

In Example 10, the subject matter of Example 9 optionally includes a decoder to decode a mutual authentication message from a device that is received via the transmitter in a D2D/ProSe communication channel in response to the discovery request, wherein the encoder is to encode the UE-specific discovery key, and wherein the transmitter is to transmit the encoded UE-specific discovery key to the device in response to the mutual authentication message.

In Example 11, the subject matter of any one or more of Examples 1-10 optionally include an antenna coupled to the transmitter.

Example 12 is an apparatus of a user equipment (UE), the apparatus for secure direct discovery among UEs, the apparatus comprising: a transmitter to receive a discovery message in a device-to-device (D2D) discovery channel from a device; a decoder to extract an identity and a message integrity code (MIC) from the discovery message; and a security component to: control the transmitter to perform a mutual authentication with the device in response to extracting the identity and the MIC; and use results of the mutual authentication to verify identity of device in future D2D discovery messages.

In Example 13, the subject matter of Example 12 optionally includes wherein the discovery message is less than or equal to 233 bits.

In Example 14, the subject matter of any one or more of Examples 12-13 optionally include wherein the MIC is calculated from a direct frame number stored in a MasterInformationBlock-SL data structure transmitted in a physical sidelink broadcast channel (PSBCH).

In Example 15, the subject matter of any one or more of Examples 12-14 optionally include wherein the discovery message includes: a type field with a value of solicitation; and a target info field identifying at least one of a user or a group of users.

In Example 16, the subject matter of any one or more of Examples 12-15 optionally include wherein the discovery message includes: a type field with a value of response; and a discoveree info field with a value including a user identity of the UE.

In Example 17, the subject matter of any one or more of Examples 12-16 optionally include wherein the discovery message includes: a type field with a value of announcement; and a announcer info field with a value including a user identity of the UE.

In Example 18, the subject matter of any one or more of Examples 12-17 optionally include wherein the identity is a ProSe discovery group identification (ID), and wherein the MIC is decoded using a locally stored shared key corresponding to the group discovery ID and fields of the discovery message.

Example 19 is a first User Equipment (UE) configured to: receive a discovery message from a second UE without performing integrity check of the received message; establish a security association with the second UE; periodically receive a discovery message from the second UE including performing integrity check of the received message.

In Example 20, the subject matter of Example 19 optionally includes wherein the received discovery message includes an asserted identity sent as clear text and a message integrity check value.

In Example 21, the subject matter of Example 20 optionally includes wherein the message integrity check value is calculated using a UE-specific discovery key of the second UE and a direct frame number carried in PSBCH (MasterInformationBlock-SL).

In Example 22, the subject matter of any one or more of Examples 19-21 optionally include wherein the establishment of security association is triggered either because of UE's interest in the asserted identity or because of UE's being identified as a target discoveree, and because of UE's not knowing of the UE-specific discovery key of the second UE.

In Example 23, the subject matter of Example 22 optionally includes wherein the establishment of security association includes mutual authentication between the UE and the second UE and secure exchange of UE-specific discovery keys.

In Example 24, the subject matter of Example 23 optionally includes wherein upon receiving of a subsequent discovery message the UE performs message integrity check using the UE-specific key of the second UE.

Example 25 is a first User Equipment (UE) configured to receive a protected discovery message from an announcing UE.

In Example 26, the subject matter of Example 25 optionally includes wherein the received discovery message includes an asserted identity (e.g., Group identity, User identity) sent as clear text and a message integrity check value.

In Example 27, the subject matter of Example 26 optionally includes wherein the message integrity check value is calculated using a UE-specific discovery key (derived from Group Discovery Key) and a direct frame number carried in PSBCH (MasterInformationBlock-SL).

In Example 28, the subject matter of Example 27 optionally includes wherein the received discovery message includes encrypted information, for example, over the Announcer Info (i.e. user's identity) and over the ProSe UE ID (i.e. the layer-2 identifier of sending UE) for privacy reasons.

In Example 29, the subject matter of Example 28 optionally includes wherein the ciphered information is decrypted using the Discovery Key (derived from Group Discovery Key) and a Direct Frame Number carried in PSBCH (MasterInformationBlock-SL).

In Example 30, the subject matter of any one or more of Examples 25-29 optionally include, wherein the UE maintains an autonomous coarse UTC counter with granularity of 10.24 seconds.

In Example 31, the subject matter of Example 30 optionally includes wherein the UE concatenates the coarse UTC counter with the Direct Frame Number and uses a truncated part of the concatenated string for computation of encryption and integrity check algorithms.

In Example 32, the subject matter of Example 31 optionally includes wherein in case of encryption or integrity check failure of the received message the UE makes another attempt by using a coarse UTC counter value that is either increased or decreased by one, in concatenation with the Direct Frame Number.

Example 33 is a first User Equipment (UE-1) configured to broadcast a protected Solicitation discovery message to discover group members in vicinity (e.g., user of UE-2).

In Example 34, the subject matter of Example 33 optionally includes wherein the received Solicitation discovery message includes an asserted identity (e.g., Group identity, User identity) sent as clear text and a message integrity check value.

In Example 35, the subject matter of Example 34 optionally includes wherein the message integrity check value is calculated using the discovery key (derived from a pre-shared Group Discovery Key) and a direct frame number carried in PSBCH (MasterInformationBlock-SL) in order to verify the authenticity of the UE-1 (i.e., solicitor).

In Example 36, the subject matter of any one or more of Examples 33-35 optionally include wherein the received discovery message includes encrypted information, for example, over the Announcer Info (i.e. user's identity) and over the ProSe UE ID (i.e. the layer-2 identifier of sending UE) for privacy reasons.

In Example 37, the subject matter of Example 36 optionally includes wherein the ciphered information is decrypted using the Discovery Key (derived from Group Discovery Key) and a Direct Frame Number carried in PSBCH (MasterInformationBlock-SL).

In Example 38, the subject matter of Example 37 optionally includes wherein the UE-2 sends a protected message in response to the Solicitation discovery message from UE-1 in Example 1.

In Example 39, the subject matter of Example 38 optionally includes wherein the received message includes an asserted identity (e.g., Group identity, User identity) of UE-2 (discoveree) sent as clear text and a message integrity check value.

In Example 40, the subject matter of Example 39 optionally includes wherein the message integrity check value is calculated using the discovery key (derived from a pre-shared Group Discovery Key) and a direct frame number carried in PSBCH (MasterInformationBlock-SL) in order to verify the authenticity of the UE-2 (i.e., responder).

In Example 41, the subject matter of Example 40 optionally includes wherein the received response message includes encrypted information, for example, over the Discoveree Info (i.e. user's identity) and over the ProSe UE ID (i.e. the layer-2 identifier of responding UE-2) for privacy reasons.

In Example 42, the subject matter of Example 41 optionally includes wherein the ciphered information is decrypted using the Discovery Key (derived from Group Discovery Key) and a Direct Frame Number carried in PSBCH (MasterInformationBlock-SL).

Example 43 is at least one machine readable medium including instructions that, when executed by a user equipment (UE), cause the UE to: initiate proximity services (ProSe) device-to-device (D2D) discovery; create a discovery request with an asserted identity in clear text and a message integrity code (MIC); and transmit the discovery request in a D2D discovery channel.

In Example 44, the subject matter of Example 43 optionally includes wherein the discovery request is less than 233 bits.

In Example 45, the subject matter of any one or more of Examples 43-44 optionally include wherein the MIC is calculated over at least an announcer info field of the discovery request.

In Example 46, the subject matter of any one or more of Examples 43-45 optionally include wherein the MIC is computed with a monotonic counter derived from a layer-1 frame parameter.

In Example 47, the subject matter of Example 46 optionally includes wherein the monotonic counter is derived from a direct frame number carried in a physical sidelink broadcast channel (PSBCH).

In Example 48, the subject matter of Example 47 optionally includes wherein the direct frame number is carried in a MasterInformationBlock-SL data structure.

In Example 49, the subject matter of any one or more of Examples 43-48 optionally include wherein the UE is affiliated with a ProSe group, wherein the asserted identity is a ProSe discovery group identifier, the UE including ProSe discovery group attributes prior to discovery, and wherein the MIC applies to portions of the discovery request.

In Example 50, the subject matter of Example 49 optionally includes wherein the ProSe discovery group identifier is a pointer to a corresponding discovery key in the ProSe discovery group attributes, the discovery key usable to decrypt encrypted portions of the discovery request.

In Example 51, the subject matter of any one or more of Examples 43-50 optionally include wherein the UE is unaffiliated with a ProSe discovery group, wherein the clear text asserted identity is a user identity, and wherein the MIC is calculated using a UE-specific discovery key.

In Example 52, the subject matter of Example 51 optionally includes instructions that cause the UE to: decode a mutual authentication message from a device that is received via the transmitter in a D2D/ProSe communication channel in response to the discovery request; encode the UE-specific discovery key; and transmit the encoded UE-specific discovery key to the device in response to the mutual authentication message.

Example 53 is at least one machine readable medium including instructions that, when executed by a user equipment (UE), cause the UE to: intercept a discovery broadcast in a device-to-device (D2D) discovery channel from a device; decode an identity and a message integrity code (MIC) from the discovery broadcast; contact the device to perform a mutual authentication based on the discovery broadcast; and use results of the mutual authentication to verify identity of device in future D2D communications.

In Example 54, the subject matter of Example 53 optionally includes wherein the discovery broadcast includes a data structure that is less than or equal to 233 bits.

In Example 55, the subject matter of any one or more of Examples 53-54 optionally include wherein the MIC cryptographically uses a direct frame number stored in a MasterInformationBlock-SL data structure transmitted in a physical sidelink broadcast channel (PSBCH) as a monotonic counter.

In Example 56, the subject matter of any one or more of Examples 53-55 optionally include wherein the discovery broadcast included a type field with a value of solicitation.

In Example 57, the subject matter of any one or more of Examples 53-56 optionally include wherein the discovery message includes: a type field with a value of response; and a discoveree info field with a value including a user identity of the UE.

In Example 58, the subject matter of any one or more of Examples 53-57 optionally include wherein the identity is a layer-2 identity of the device.

In Example 59, the subject matter of any one or more of Examples 53-58 optionally include wherein the identity is a discovery group identification (ID), and wherein the MIC is decoded using a locally stored shared key corresponding to the group discovery ID and fields of the discovery message.

Example 60 is a method for secure direct discovery, the method comprising: initiating proximity services (ProSe) device-to-device (D2D) discovery when the UE is out-of-coverage; creating a discovery request with an asserted identity in clear text and a message integrity code (MIC); and transmitting the discovery request in a D2D discovery channel.

In Example 61, the subject matter of Example 60 optionally includes wherein the discovery request is less than 233 bits.

In Example 62, the subject matter of any one or more of Examples 60-61 optionally include wherein the MIC is calculated over an announcer info field of the discovery request.

In Example 63, the subject matter of any one or more of Examples 60-62 optionally include wherein the MIC is computed with a monotonic counter derived from a layer one frame parameter.

In Example 64, the subject matter of Example 63 optionally includes wherein the monotonic counter is derived from a direct frame number carried in a physical sidelink broadcast channel (PSBCH).

In Example 65, the subject matter of Example 64 optionally includes wherein the direct frame number is carried in a MasterInformationBlock-SL data structure.

In Example 66, the subject matter of any one or more of Examples 60-65 optionally include wherein the UE is affiliated with a ProSe group, wherein the asserted identity is a discovery group identifier, the UE including discovery group attributes prior to discovery, and wherein the MIC applies to portions of the discovery request.

In Example 67, the subject matter of Example 66 optionally includes wherein the discovery group identifier is a pointer to a corresponding discovery key in the discovery group attributes, the discovery key usable to decrypt encrypted portions of the discovery request.

In Example 68, the subject matter of any one or more of Examples 60-67 optionally include wherein the UE is unaffiliated with a ProSe group, wherein the clear text security identifier is a user identity, and wherein the MIC is calculated using a UE-specific discovery key.

In Example 69, the subject matter of Example 68 optionally includes receiving a mutual authentication message from a device that is received via the transmitter in a D2D/ProSe communication channel in response to the discovery request, wherein the encoder is to encode the UE-specific discovery key, and wherein the transmitter is to transmit the encoded UE-specific discovery key to the device in response to the mutual authentication message.

Example 70 is a machine readable medium including instructions that, when executed by a machine, cause the machine to perform any of the methods of Examples 60-67.

Example 71 is a system comprising means to perform any of the methods of Examples 60-67.

Example 72 is a method for secure direct discovery, the method comprising: intercepting a discovery broadcast in a device-to-device (D2D) discovery channel from a device; decoding an identity and a message integrity code (MIC) from the discovery broadcast; contacting the device to perform a mutual authentication based on the discovery broadcast; and using results of the mutual authentication to verify identity of device in future D2D communications.

In Example 73, the subject matter of Example 72 optionally includes wherein the discovery broadcast includes a data structure that is less than or equal to 233 bits.

In Example 74, the subject matter of any one or more of Examples 72-73 optionally include wherein the MIC cryptographically uses a direct frame number stored in a MasterInformationBlock-SL data structure transmitted in a physical sidelink broadcast channel (PSBCH) as a monotonic counter.

In Example 75, the subject matter of any one or more of Examples 72-74 optionally include wherein the discovery broadcast included a type field with a value of solicitation.

In Example 76, the subject matter of any one or more of Examples 72-75 optionally include wherein the discovery message includes: a type field with a value of response; and a discoveree info field with a value including a user identity of the UE.

In Example 77, the subject matter of any one or more of Examples 72-76 optionally include wherein the identity is a layer-2 identity of the device.

In Example 78, the subject matter of any one or more of Examples 72-77 optionally include wherein the identity is a discovery group identification (ID), and wherein the MIC is decoded using a locally stored shared key corresponding to the group discovery ID and fields of the discovery message.

Example 79 is a system for secure direct discovery, the system comprising: means for initiating proximity services (ProSe) device-to-device (D2D) discovery when the UE is out-of-coverage; means for creating a discovery request with an asserted identity in clear text and a message integrity code (MIC); and means for transmitting the discovery request in a D2D discovery channel.

In Example 80, the subject matter of Example 79 optionally includes wherein the discovery request is less than 233 bits.

In Example 81, the subject matter of any one or more of Examples 79-80 optionally include wherein the MIC is calculated over an announcer info field of the discovery request.

In Example 82, the subject matter of any one or more of Examples 79-81 optionally include wherein the MIC is computed with a monotonic counter derived from a layer one frame parameter.

In Example 83, the subject matter of Example 82 optionally includes wherein the monotonic counter is derived from a direct frame number carried in a physical sidelink broadcast channel (PSBCH).

In Example 84, the subject matter of Example 83 optionally includes wherein the direct frame number is carried in a MasterInformationBlock-SL data structure.

In Example 85, the subject matter of any one or more of Examples 79-84 optionally include wherein the UE is affiliated with a ProSe group, wherein the asserted identity is a discovery group identifier, the UE including discovery group attributes prior to discovery, and wherein the MIC applies to portions of the discovery request.

In Example 86, the subject matter of Example 85 optionally includes wherein the discovery group identifier is a pointer to a corresponding discovery key in the discovery group attributes, the discovery key usable to decrypt encrypted portions of the discovery request.

In Example 87, the subject matter of any one or more of Examples 79-86 optionally include wherein the UE is unaffiliated with a ProSe group, wherein the clear text security identifier is a user identity, and wherein the MIC is calculated using a UE-specific discovery key.

In Example 88, the subject matter of Example 87 optionally includes means for receiving a mutual authentication message from a device that is received via the transmitter in a D2D/ProSe communication channel in response to the discovery request, wherein the encoder is to encode the UE-specific discovery key, and wherein the transmitter is to transmit the encoded UE-specific discovery key to the device in response to the mutual authentication message.

Example 89 is a system for secure direct discovery, the system comprising: intercepting a discovery broadcast in a device-to-device (D2D) discovery channel from a device; decoding an identity and a message integrity code (MIC) from the discovery broadcast; and contacting the device to perform a mutual authentication based on the discovery broadcast; and using results of the mutual authentication to verify identity of device in future D2D communications.

In Example 90, the subject matter of Example 89 optionally includes wherein the discovery broadcast includes a data structure that is less than or equal to 233 bits.

In Example 91, the subject matter of any one or more of Examples 89-90 optionally include wherein the MIC cryptographically uses a direct frame number stored in a MasterInformationBlock-SL data structure transmitted in a physical sidelink broadcast channel (PSBCH) as a monotonic counter.

In Example 92, the subject matter of any one or more of Examples 89-91 optionally include wherein the discovery broadcast included a type field with a value of solicitation.

In Example 93, the subject matter of any one or more of Examples 89-92 optionally include wherein the discovery message includes: a type field with a value of response; and a discoveree info field with a value including a user identity of the UE.

In Example 94, the subject matter of any one or more of Examples 89-93 optionally include wherein the identity is a layer-2 identity of the device.

In Example 95, the subject matter of any one or more of Examples 89-94 optionally include wherein the identity is a discovery group identification (ID), and wherein the MIC is decoded using a locally stored shared key corresponding to the group discovery ID and fields of the discovery message.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus of a User Equipment (UE), the apparatus comprising: memory; and processing circuitry coupled to the memory, wherein to protect a Group Member Discovery Message, the processing circuitry is configured to: generate the Group Member Discovery Message comprising a proximity services (ProSe) UE identifier (ID), Announcer Info, and a Discovery Group ID, wherein when the Group Member Discovery Message is sent, a first part of the Group Member Discovery Message comprising the Discovery Group ID is sent in clear-text, and wherein a remaining part of the Group Member Discovery Message is protected by message-specific confidentiality; calculate a Message Integrity Code (MIC) using a discovery user integrity key (DUIK); add the message-specific confidentiality to the Group Member Discovery Message; append the MIC to the Group Member Discovery Message; and encode the Group Member Discovery Message including the appended MIC for transmission, wherein a length of the Group Member Discovery Message is constrained, wherein the processing circuitry is further configured to encode, at pre-defined discovery intervals, the Group Member Discovery Message, and wherein the memory is configured to store the Group Member Discovery Message.

2. The apparatus of claim 1, wherein the MIC is computed based on a Coordinated Universal Time (UTC)-based counter.

3. The apparatus of claim 1, wherein a Coordinated Universal Time (UTC)-based counter is used to calculate the message-specific confidentiality to the Group Member Discovery Message.

4. The apparatus of claim 1, wherein the ProSe UE ID is a link layer identifier and is used for subsequent direct one-to-one and one-to-many communication.

5. The apparatus of claim 1, wherein the announcer info provides information about an announcing user.

6. The apparatus of claim 1, wherein the discovery group ID identifies a discovery group that the UE belongs to.

7. The apparatus of claim 1, wherein the Discovery Group ID is sent in clear-text without encryption.

8. A non-transitory computer-readable storage medium that stores instructions for execution by processing circuitry of a user equipment to configured to UE to protect a Group Member Discovery Message, the processing circuitry is configured to:
generate the Group Member Discovery Message comprising a proximity services (ProSe) UE identifier (ID), Announcer Info, and a Discovery Group ID, wherein when the Group Member Discovery Message is sent, a first part of the Group Member Discovery Message comprising the Discovery Group ID is sent in clear-text, and a remaining part of the Group Member Discovery Message is protected by message-specific confidentiality;
calculate a Message Integrity Code (MIC) using a discovery user integrity key (DUIK);
add the message-specific confidentiality to the Group Member Discovery Message;
append the MIC to the Group Member Discovery Message; and
encode the Group Member Discovery Message including the appended MIC for transmission,
wherein a length of the Group Member Discovery Message is constrained,
wherein the processing circuitry is further configured to encode, at pre-defined discovery intervals, the Group Member Discovery Message, and
wherein the Group Member Discovery Message is stored in the memory.

9. The non-transitory computer-readable storage medium of claim 8, wherein the MIC is computed based on a Coordinated Universal Time (UTC)-based counter.

10. The non-transitory computer-readable storage medium of claim 8, wherein a Coordinated Universal Time (UTC)-based counter is used to calculate the message-specific confidentiality to the Group Member Discovery Message.

11. The non-transitory computer-readable storage medium of claim 8, wherein the ProSe UE ID is a link layer identifier and is used for subsequent direct one-to-one and one-to-many communication.

12. The non-transitory computer-readable storage medium of claim 8, wherein the announcer info provides information about an announcing user.

13. The non-transitory computer-readable storage medium of claim 8, wherein the discovery group ID identifies a discovery group that the UE belongs to.

14. The non-transitory computer-readable storage medium of claim 8, wherein the Discovery Group ID is sent in clear-text without encryption.

* * * * *